Patented Dec. 9, 1947

2,432,465

UNITED STATES PATENT OFFICE 2,432,465

METHOD OF MAKING METALLIC PIGMENTS

Gordon M. Babcock, Louisville, Ky., assignor to Reynolds Metals Company, New York, N. Y., a corporation of Delaware No Drawing. Application October 4, 1941, Serial No. 413,692

10 Claims. (Cl. 106—290)

This invention relates to protective coatings, metallic pigments therefor, and the method of making the same.

Protective coatings which employ as a pigment both metal particles which will collect at the surface to be coated and possess rust resistant or rust inhibitive characteristics and also metal particles which will collect at the face of the coating and provide a bright or silvery finish are highly desirable for certain classes of work. Furthermore, protective coatings which may be applied to nonmetallic surfaces, such as paper, leather, fabric, etc., and also to metallic surfaces, that will provide a bright or silvery finish while utilizing a major proportion of metal particles of less expensive material such as are not capable of providing such a finish, are also highly desirable for many purposes.

Particles of lead, zinc and the like, possessing rust resistant or rust inhibitive characteristics, may be mixed with particles of aluminum having leafing characteristics, to form a pigment that may be used with suitable vehicles to provide a coating material, but grave difficulties have been encountered in the production of such pigments and coating materials because when lead or zinc sheets or foils are broken up into metal flakes in a dry stamp or hammer mill the particles tend to weld together, forming buttons or nodules that render the material unfit as a pigment. The dry hammering of these metals is also accompanied by grave fire and explosion hazards. Furthermore, as these metals oxidize or carbonate rapidly, particularly when formed into particle form in the dry state, grave difficulties have been encountered because, when such particles are mixed with aluminum or other suitable flakes having a leafing characteristic, the leafing film is so quickly destroyed as to result in the coating having a dull, dark or grayish finish.

In order to avoid the fire and explosion hazards as well as the welding of the particles in producing zinc, lead and like metal pigments, the hammering can be carried out while the metal pieces are immersed in a lubricant to provide films separating the metallic particles as the disintegration goes on. The necessity for using relatively large quantities of such a lubricant during the hammering process results in certain marked disadvantages, so that it is highly desirable to carry out the hammering process in a relatively dry state.

It is an object of this invention to provide a method of making metal pigments employing such metals as lead, zinc, or the like in which true metal flakes may be formed by a substantially dry process.

Another object of this invention is to provide a method of the type characterized in which the resulting pigment is kept below a predetermined pH value so as to avoid the rapid destruction of leafing films on leafing metallic pigment flakes mixed therewith.

Another object of this invention is to provide a method of the type characterized which will produce a metallic pigment that, when mixed with a suitable vehicle as hereinafter explained, will afford a covering having a bright or silvery finish although the major part of the pigment is composed of non-leafing metallic particles.

Another object of this invention is to provide a method of the type last characterized wherein the non-leafing metallic particles used may be of a rust resistant or rust inhibitive characteristic, particularly when the pigment is to be used in coating steel, iron or other corrodible metallic surfaces.

Another object of this invention is to provide a method of the type characterized which will produce a pigment that when mixed with a suitable vehicle as hereinafter explained will provide a covering material that retains its characteristic of providing a bright or silvery finish for several hours after the pigment is mixed with its vehicle, so as to afford ample time for the application of the coating without material deterioration of its capacity to provide such a finish.

Another object of this invention is to provide a metallic pigment that will supply a bright or silvery finish although composed in major part of metal particles having little or no leafing characteristic.

Another object of this invention is to provide a metallic pigment composed of metallic particles which will provide a rust resistant or rust inhibitive layer on a metal surface to which it is applied while also providing a bright or silvery surface at the face of the coating.

Another object of this invention is to provide a coating material including a metallic pigment and a vehicle which is of such character that the coating will have a bright or silvery finish although a major part of the metallic pigment is composed of particles incapable of producing such an appearance.

Another object of this invention is to provide a coating material of the type last characterized that, when the pigment and its vehicle are mixed together, will afford ample time for application of the coating material to a surface without deterioration of the capacity of the coating material to provide a bright or silvery finish.

Another object of this invention is to provide a method of making a metallic pigment which assures that the metal particles will not weld together while being formed into true flakes in a stamp or hammer mill under relatively dry conditions.

Another object of this invention is to provide a method of the type last characterized which utilizes as a lubricant in the dry forming of said flakes a metal that becomes a part of the ultimate pigment.

Another object of this invention is to provide a method of making a metallic pigment which may be carried out with the metal in a relatively dry state and yet which is safe and expeditious, economical, and results in the production of true metal flakes having the desired physical characteristics.

Another object of this invention is to provide a coating material which provides the desired bright finish although only a minor part of the composition is constituted by flakes carrying leafing films.

Another object of this invention is to provide a coating material of the type last characterized in which the capacity of the leafing particles to leaf is preserved for a sufficient time to assure that the coating material may be properly applied without substantial loss of the leafing characteristic.

Another object of this invention is to provide a method of making a pigment for coating materials that employs in part particles carrying leafing films and in part particles not provided with such films without early deterioration of the leafing characteristics of the former particles.

Another object of this invention is to provide a novel metallic pigment, coating material, and method of making the same, which will overcome the difficulties and disadvantages encountered in mixing leafing aluminum or like flakes with lead, zinc and similar metallic powders.

Other objects will appear as the description of the invention proceeds.

The present invention contemplates the use of any suitable soft metal i. e. any metal sufficiently malleable to be hammered into flakes as the base material, i. e., the material which constitutes the metallic body of the flake, whether in simple or composite sheets, foils, small pieces, etc., and particularly lead, zinc and the like foils, whether of a simple or a composite structure, but inasmuch as the present invention possesses particular advantage in that scraps of tin coated lead foil and aluminum coated zinc foil may be used as the base material, the invention will be particularly described by reference to the use of such foils, but with the express understanding that where lead, zinc, or the like, are hereinafter referred to it is the intent to embrace within said terms that said metals may be in the form of sheets, foils or pieces of uncoated lead, zinc, or the like, and alloys thereof, as well as in the form of sheets, foils or pieces of such metals coated with tin, aluminum or other suitable facing metals.

Tin coated lead foils and aluminum coated zinc foils are commonly rolled down to thicknesses of .00065", and if the base material to be used, whether in the form of a single metal or alloy or of a composite structure, is not already of a thickness on this order, it is preferably rolled to such a thickness, or at least a suitable thinness for disintegration in a relatively dry state in a stamp or hammer mill. The sheets, foils or pieces may be specially prepared for use in the present process, or the process may be applied to scraps or pieces of foil or the like arising from the regular production of such foils or other manufacturing operations. If not already in small pieces the foil is broken up into small pieces, and these pieces are suitably fed to a dry stamp mill, hammer mill, or other suitable equipment that is adapted to produce a true metal flake while operated upon in a relatively dry form.

In order to prevent welding of the flakes together during their formation in such a relatively dry state, a small amount of lubricating material is added. I have discovered that if small amounts of aluminum, which may also be in the form of small pieces or foil of approximately the aforesaid thickness, are added to the lead or zinc, the aluminum used constituting from 2% to 5% of the total weight of the metal being hammered, the aluminum provides the necessary lubricating action, the aluminum working between the flakes of the base metal being formed and acting both as a lubricant and as a separation layer between the particles of base metal being reduced. While aluminum may be used as the sole lubricating material, it may be supplemented by small amounts of additional non-metallic lubricating materials of an oily, greasy or fatty character, up to 1% of the total metal by weight. Suitable lubricants for this purpose are fats or oils, as members of the saturated fatty acid series, for example palmitic, stearic and myristic acids, or petroleum lubricants, as ordinary lubricating oils and greases, or lard-hydrogenated products, as hydrogenated cottonseed oil, etc. The use of up to 1% of such fatty or oily materials minimizes burning or explosion during the hammering operation and also facilitates formation of polished surfaces on the finished flakes.

Whether aluminum is used alone or in combination with up to 1% of oily or fatty materials, not only are the particles of lead or zinc duly lubricated, and welding of the particles together prevented, but the metal surfaces of the flakes as formed during disintegration are so coated as to minimize oxidation or carbonation of the fresh metallic surfaces being produced. Also, additional color and brilliance may be imparted to the particles formed. If certain types of lubricant are used, especially saturated fatty acids of the stearic acid series, the flakes may have a leafing characteristic imparted thereto.

When the flakes of the base metal have been reduced to proper size in the presence of the lubricant including aluminum in the dry stamp or hammer mill as above referred to, the aluminum content, by way of example, is increased by the addition of aluminum leafing pigment to the base metal flakes so as to bring the total aluminum content of the mixed pigment up to the desired point, preferably 25% of the weight of the pigment, although this may be considerably varied depending on the use to which the pigment is to be put, the effect desired, etc. The pigment so produced may then be mixed with a suitable vehicle, as hereinafter explained, to produce a coating material that when applied will have the effect ordinarily produced when a full leafing aluminum pigment is used as the entire pigment material.

Experience has shown that lead or zinc pigments as heretofore produced have a very rapid deleafing effect when mixed with a leafing aluminum pigment in ordinary vehicles, making it impossible to retain the leafing capacity of the mixed pigment during commercial coating operations. Thus it has been found that when lead or other similar base metal is hammered dry in the air, lead compounds, including lead oxides and perhaps carbonates, are formed on the lead particles, and these compounds may destroy the leafing effect of the leafing aluminum pigment in from one minute to one-half hour. When a pigment is prepared in conformity with the process herein disclosed, however, the leafing capacity of the coating material is retained for at least several hours so as to afford ample time for commercial application. Experience has demonstrated that the leafing characteristic is not seriously affected for at least from four to eight hours after the pigment is mixed with a suitable vehicle.

In order that the foregoing result shall be obtained the hammering process is carried out under such conditions as to limit the formation of oxides and other compounds producing an alkaline reaction. It has been found that at a pH value of 8.0 the leafing characteristic of the aluminum flakes will be destroyed in a very short time after addition to the base metal particles, usually within fifteen to thirty minutes, but if the pH value is kept below 8.0, preferably below 7.6, and desirably around 7.2 to 7.4, the base metal flakes when mixed with the leafing aluminum pigment in a proper vehicle will not seriously affect the leafing characteristic of the aluminum flakes for from four to eight hours. To determine the pH value of the base metal flakes being formed, one gram of the metal flakes from the mill is boiled for five minutes in distilled water, the water filtered and a pH reading taken. If the pH value is found to be over 7.6 the speed of the mill is reduced. The temperature in the hammer mill should be kept below 160° F., as higher temperatures facilitate a too rapid formation of oxides or other compounds that increase the pH value.

Alkaline leaf destroying compounds may also be neutralized during the flaking operation or before or when the leafing aluminum flakes are added, by mixing with the base metal flakes a suitable acid salt, preferably a salt of aluminum, such as aluminum sulphate or aluminum acetate, to control the pH value of the pigment. Such an acid salt up to 2% by weight of the metal being hammered may be employed depending upon the pH value of the pigment being formed.

While I have described my process by reference to foils of lead with a tin coating or zinc with an aluminum coating preferably rolled to approximately .00065" in thickness, it is to be understood that lead or zinc without such coatings may be satisfactorily used by following the same procedure, as well as foils, of these metals employing other suitable coating metals, and also other suitable soft base metals whether in the form of simple or composite structures, and some variation may be had in the thickness or form of the metal to be worked into flakes, the aluminum supplied to the hammer mill as above described acting to prevent the welding of the metal particles and performing the lubricating function above referred to.

To secure the full effect of the leafing characteristic of the finished pigment, and provide a coating which has the lustre, color and appearance of aluminum coatings, for example, it is necessary to use therewith a suitable vehicle or carrier, preferably in the form of a neutral gum varnish having a specific gravity of over .860 and a viscosity of not over 0.85 poises at 77° F. With vehicles or carriers of lighter specific gravity or heavier viscosity the full leafing effect is not obtained. The vehicle should contain no highly polar compounds, and should be made from practically neutral resins, when resins are used, with or without kettle bodied oils of the drying type. When an oil is used, it should be of the kettle bodied type as blown oils have leaf destroying properties. A lead drier should never be used. The term "resin" as used herein is intended to include bituminous materials such as asphalts, coal tar pitches and resins from these sources. Suitable vehicles are illustrated by the following formulae:

(1) Paracoumerone indene resins—100 pounds.
    Kettle bodied oils—10 gallons.
    Cobalt drier—to give .01% cobalt on oil.
(2) Paracoumerone indene resins—100 pounds.
    Dibutyl phthalate—2 pounds.
(3) Paracoumerone indene resins (70% resin solution)—140 pounds.
    Kettle bodied linseed oil—5 gallons.
    Cobalt drier—to give .01% cobalt on oil.

In each of the foregoing instances the specified materials should be reduced by cold cutting or by gentle heating with a suitable solvent, such as high flash naptha, toluol, xylol, mineral spirits, etc., to approximately 0.65 poise viscosity. In using the foregoing formulae any suitable kettle bodied oils having an acid number less than 6 may be used, such as sardine oil, linseed oil and similar oils, which are heated without the addition of metal driers or other active ingredients, while preferably keeping the acid number below 3.5, the iodine value above 100, and the viscosity to approximately Z–1.

If desired, the coating material may have incorporated therein any suitable rust inhibiting agent, whether organic or inorganic in character, as for example lead or zinc chromate. The rust inhibitor may be added in the mill or along with the flake in the production of the final pigment or when the pigment is mixed with its vehicle.

A coating material made in conformity with the foregoing disclosure may be applied in any suitable way to any suitable surface. It possesses marked advantages as a coating for metal surfaces, because the zinc or lead particles are deposited on the metal surface and tend to inhibit or resist corrosion, although as above indicated rust prevention may be increased by the use of any suitable rust inhibitor in the material, while the aluminum flakes, for example, because of their retention of the leafing characteristic, come to the free surface of the coating film and give the appearance of a continuous aluminum paint having a bright silvery finish. By reason of the manner in which the coating material is formed this leafing characteristic of the contained aluminum flake persists for at least from four to eight hours, affording ample time for the application of the coating after the coating material is mixed with its vehicle. Thereby are avoided the dark or grayish hues heretofore obtained, when lead and aluminum or zinc and aluminum powders have been mixed, due to oxidation or carbonation of the lead or zinc particles and the destruction of the leafing characteristic of the aluminum flake quickly after mixture with its vehicle. The leafing effect may be checked by mixing 15 grams of the pigment with 42 cc. of any suitable vehicle as above disclosed and stirring every half hour for a period of four hours. A material in conformity with the present invention will at the end of that period leaf entirely over a coat of the material to give a bright aluminum-appearing film.

The pigment as heretofore disclosed, while thus particularly adapted for the production of coating materials for use on metal surfaces, is also possessed of wide utility for production of coating materials for use on other character of surfaces. For example, when mixed with any suitable vehicle, which may be either a varnish, a lacquer, or even a water carrier, it may be used for coating paper, leather, and the like, or the pigment may be sprinkled on a surface suitably treated to make it adherent. In either event the coating so formed may be burnished when dry to produce an appearance of metal foil.

While, as before pointed out, the present invention preferably uses as base material composite foils, as tin coated lead or aluminum coated zinc, the invention is not restricted thereto as the invention can also be applied using lead or zinc without dissimilar facing metals thereon, or using lead, or zinc coated with other suitable metals, or using various alloys of zinc, lead, etc., or in fact using any suitable soft metal that can be broken up without welding to suitable particles in a stamp or hammer mill and appropriately used as a base material with the leafing aluminum flake. Furthermore, while the invention has been particularly exemplified by reference to the use of leafing aluminum flakes, certain aspects of the invention are susceptible to use in the production of pigments and coating materials using other leafing metallic flakes if other than a silvery finish is desired.

Other modifications of and variations in the procedure and resulting pigment and coating material will also be apparent to those skilled in the art without departing from the spirit of this invention. While preferred procedures and materials have been described with considerable particularity, the invention is not restricted thereto, but the illustrations given are to be taken as representative of the scope and character of the invention with the recognition that equivalent procedures and materials may be used, certain features of the invention may be used without other features, and changes may be made as respects details of procedure and material without departing from the spirit of this invention. Reference is therefore to be had to the appended claims for a definition of the invention.

What is claimed is:

1. In a method of making a metallic pigment, forming flakes of a metal which is sufficiently malleable to be hammered into flakes by dry hammering small pieces of said metal while mixed with small pieces of aluminum to prevent welding of the metal flakes together.

2. In a method of making a metallic pigment, forming flakes of a metal which is sufficiently malleable to be hammered into flakes by dry hammering small pieces of said metal while mixed with small pieces of aluminum to prevent welding of the metal flakes together, said aluminum constituting from 2% to 5% of the total weight of the metal acted upon.

3. In a method of making a metallic pigment, forming flakes of a metal which is sufficiently malleable to be hammered into flakes by dry hammering small pieces of said metal while mixed with small pieces of aluminum and up to 1% of a nonmetallic lubricant to prevent welding of the metal flakes together.

4. In a method of making a metallic pigment, forming flakes of a metal which is sufficiently malleable to be hammered into flakes by dry hammering small pieces of said metal while mixed with small pieces of aluminum and up to 1% of a nonmetallic lubricant to prevent welding of the metal flakes together, said aluminum constituting from 2% to 5% of the total weight of the metal acted upon.

5. In a method of making a metallic pigment, forming flakes from relatively soft metal from the group consisting of lead, zinc, alloys thereof, foils of tin coated lead and aluminum coated zinc and other composite sheets thereof by dry hammering small pieces of said metal mixed with small pieces of aluminum to prevent welding of the metal flakes together.

6. In a method of making a metallic pigment, forming flakes of a metal which is sufficiently malleable to be hammered into flakes by dry hammering small pieces of said metal while mixed with small pieces of aluminum to prevent welding of the metal flakes together and controlling the pH value of the pigment being formed to a value below 8.0.

7. In a method of making a metallic pigment, forming flakes of a metal which is sufficiently malleable to be hammered into flakes by dry hammering small pieces of said metal while mixed with small pieces of aluminum to prevent welding of the metal flakes together and controlling the pH value of the pigment being formed to a value not exceeding 7.6.

8. In a method of making a metallic pigment, forming flakes of a metal which is sufficiently malleable to be hammered into flakes by dry hammering small pieces of said metal while mixed with small pieces of aluminum to prevent welding of the metal flakes together and adding a neutralizing salt to maintain the pH value of the pigment being formed to a value not over 7.6.

9. In a method of making a metallic pigment, forming flakes of a metal which is sufficiently malleable to be hammered into flakes by dry hammering small pieces of said metal while mixed with small pieces of aluminum to prevent welding of the metal flakes together and controlling the temperature of the hammering operation to restrict the formation of alkaline salts of the base metal so that the pH value thereof does not exceed 7.6.

10. In a method of making a metallic pigment, forming flakes of a metal which is sufficiently malleable to be hammered into flakes by dry hammering small pieces of said metal while mixed with small pieces of aluminum to prevent welding of the metal flakes together and increasing the metallic content of the pigment up to 25% by weight of the pigment by adding metallic leafing aluminum flake pigment thereto.

GORDON M. BABCOCK.

REFERENCES CITED

The following references are of record in the file of this patent:

UNITED STATES PATENTS

| Number | Name | Date |
|---|---|---|
| 1,269,116 | Reimuller | June 11, 1918 |
| 2,272,629 | Arthur | Feb. 10, 1942 |
| 2,273,832 | Carney | Feb. 24, 1942 |
| 2,299,034 | Reynolds | Oct. 13, 1942 |